UNITED STATES PATENT OFFICE.

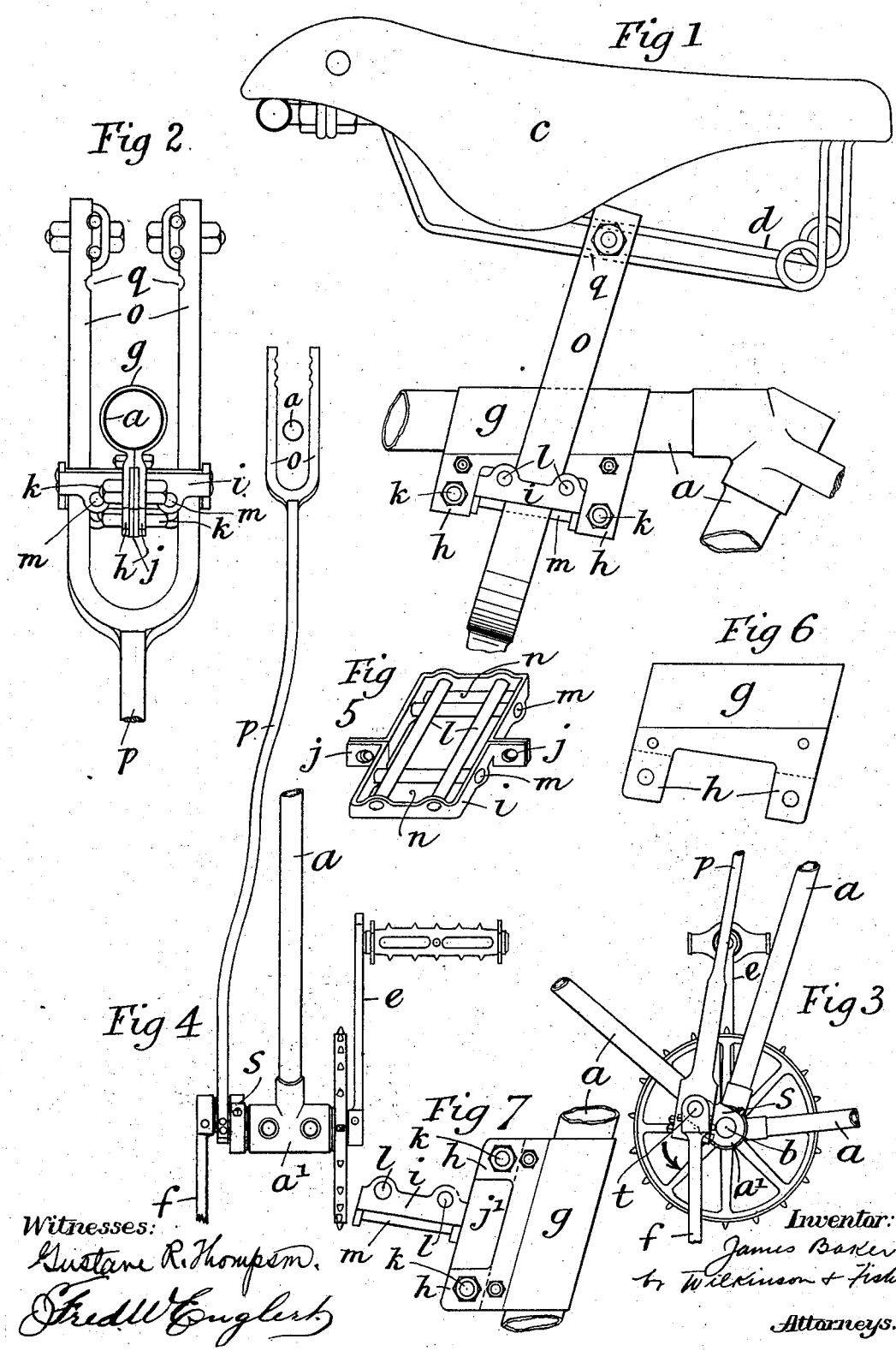

JAMES BAKER, OF MELBOURNE, VICTORIA, AUSTRALIA.

BICYCLE DRIVING MECHANISM.

SPECIFICATION forming part of Letters Patent No. 693,214, dated February 11, 1902.

Application filed July 9, 1901. Serial No. 67,649. (No model.)

*To all whom it may concern:*

Be it known that I, JAMES BAKER, a subject of King Edward VII, King of the United Kingdom of Great Britain and Ireland, residing at 237 Dryburgh street, Melbourne, in the State of Victoria, Australia, have invented certain new and useful Improvements in Bicycle Driving Mechanism; and I do hereby declare the following to be a full, clear, and exact description of the invention, such as will enable others skilled in the art to which it appertains to make and use the same.

The object of this invention is to provide improvements in bicycles or other velocipedes in which the weight of the rider upon the saddle furnishes part of the driving power. There have been different inventions for this purpose; but this invention comprises important features of a novel character, avoiding complication and undue weight, providing useful adjustability, and being easily fitted to or removed from an ordinary bicycle.

The saddle in this invention is not hinged to its support, so as to rock, nor is it on slides, so as to move horizontally. Its motion is elliptical and will be understood from the construction next described.

Referring to the accompanying drawings, in which the scale is about half natural size, except Figures 3 and 4, which are about one-sixth actual size, Figs. 1 and 3 are side views of the upper and lower parts, respectively, of a bicycle-frame fitted according to this invention. Figs. 2 and 4 are respective front elevations of the parts in Figs. 1 and 3. Fig. 5 shows in perspective the roller-bearing guide-frame for the forked saddle-support. Fig. 6 is a side view of the clip for securing the said guide-frame to the upper backbone of an ordinary bicycle, and Fig. 7 shows another arrangement in side view wherein the clip is connected to a lady's cycle having no upper backbone.

The ordinary frame of the bicycle is marked $a$, the crank-axle $b$, (passing through the bottom bracket $a'$, Fig. 3,) and the saddle $c$, (on springs or the like $d$.) The pedal-cranks are $e$ and $f$, the former in its ordinary position.

$g$ is a clip on the cycle-frame, which it is (in any suitable manner) made to grip tightly. It has lugs $h$, between or to which are suitably connected, as by bolts $k$, ears $j$, Fig. 5, or ear $j'$, Fig. 7, of a frame $i$, usually made in two parts united together. Frame $i$ has a pair of parallel rollers $l$ and another pair of rollers $m$, parallel to each other, but at right angles to rollers $l$. Within spaces $n\ n$, Fig. 5, each bounded on three sides by a roller, the members of the saddle-supporting fork $o$ pass through the said frame. These members have suitable means for the connection of the saddle thereto, as grooves $q$.

The fork is at the top of a rod $p$, which operates a special crank $s$. The lower end of rod $p$ is connected to the crank-pin $t$, Fig. 3, which projects from the outer end of the special crank $s$, the inner end of which is journaled on the crank-axle $b$.

To the pin $t$ at the outer end of the crank $s$ is rigidly connected the inner end of crank $f$. Cranks $e$ and $f$ are not on the same axis, nor is crank $f$ (on one side of rod $p$) in line with crank $s$, (on the other side of said rod,) but, as seen in Fig. 3, at an angle thereto, so that there will be no dead-center, the turning or down thrust on crank $s$ by the utilization of the rider's weight being most powerful when or about when the pedal thrust is least effective.

The rider's weight on saddle $c$ depresses rod $p$ and forces crank $s$ around in the direction shown by the arrow in Fig. 3. When crank $s$ points vertically downward, its next half-revolution raises the rod $p$ and saddle $c$, and to facilitate this the rider may rise from his seat, the pedals taking his weight, most of this weight being put on the forward pedal—that is, the then descending one. With practice this can be carried out, resulting in increased speed. As is well known, some racing bicyclists do not rest always on their saddles when riding ordinary bicycles, but, on the contrary, at times stand on the pedals in order to increase their speed.

By means of the fork the saddle is kept central over the frame $a$, while the rollers $l\ m$ minimize friction and limit oscillatory movement of the saddle. The more or less oblique up-and-down movement takes place in a vertical plane. The obliqueness may be varied to suit the rider by adjusting the position of clip $g$. Any well-known means of varying the height of the saddle from the pedals may be employed, if desired.

What I claim as my invention, and desire to secure by Letters Patent of the United States, is—

1. In a cycle of the class indicated, the combination with the frame thereof, and driving mechanism therefor; of a guide-frame having two pairs of roller-bearings at right angles to one another, a clip for holding said guide-frame in position, ears for securing said frame to said clip, a rod passing through said guide-frame, a saddle upon said rod, and means connecting said rod to the driving mechanism, substantially as described.

2. In a cycle of the class indicated, a rod having a fork at its upper end, a saddle supported on said fork, and means for guiding said fork; of a crank-shaft having a pedal on one end and a crank $s$ on the other end to which the said rod is pivoted, and a pedal-crank connected to the crank $s$, substantially as described.

3. In a cycle of the class indicated, the combination with the frame thereof; of a guide-frame having two pairs of roller-bearings at right angles to one another, a clip for holding said guide-frame in position, a rod having a fork at the upper end, said fork passing through said guide-frame, a saddle supported upon said fork, and a crank to which said rod is connected, substantially as described.

4. In a cycle of the class indicated, the combination with the frame thereof; of a guide-frame having two pairs of roller-bearings at right angles to one another, a clip for holding said guide-frame in position, a rod having a fork at the upper end, said fork passing through said guide-frame, a saddle supported upon said fork, a crank-shaft having a pedal-crank at one end and a crank $s$ on the other end to which the said rod is pivoted, and a pedal-crank connected to said crank $s$, substantially as described.

In witness whereof I have hereunto set my hand in the presence of two witnesses.

JAMES BAKER.

Witnesses:
B. M. LOWE,
G. G. TURRI.